United States Patent
Tee et al.

(10) Patent No.: US 9,423,488 B2
(45) Date of Patent: *Aug. 23, 2016

(54) METHOD AND SYSTEM FOR USER EQUIPMENT LOCATION DETERMINATION ON A WIRELESS TRANSMISSION SYSTEM

(71) Applicant: Apple Inc., Cupertino, CA (US)

(72) Inventors: Lai King Tee, San Diego, CA (US); Geng Wu, Plano, TX (US); Jun Li, Richardson, TX (US); Yuqiang Tang, Plano, TX (US); Neng Wang, Plano, TX (US); Hua Xu, Nepean (CA); Jianglei Ma, Kanata (CA)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/509,379

(22) Filed: Oct. 8, 2014

(65) Prior Publication Data

US 2015/0045057 A1    Feb. 12, 2015

Related U.S. Application Data

(63) Continuation of application No. 13/147,272, filed as application No. PCT/US2010/000446 on Feb. 5, 2010, now Pat. No. 8,885,581.

(60) Provisional application No. 61/150,137, filed on Feb. 5, 2009, provisional application No. 61/168,087, filed on Apr. 9, 2009, provisional application No. 61/174,333, filed on Apr. 30, 2009.

(51) Int. Cl.
*H04W 64/00* (2009.01)
*H04W 4/02* (2009.01)
*G01S 5/10* (2006.01)

(52) U.S. Cl.
CPC .. *G01S 5/10* (2013.01); *H04W 4/02* (2013.01); *H04W 64/00* (2013.01)

(58) Field of Classification Search
None
See application file for complete search history.

(56) References Cited

U.S. PATENT DOCUMENTS

| | | |
|---|---|---|
| 2002/0086682 A1 | 7/2002 | Naghian |
| 2003/0064734 A1 | 4/2003 | Stilp et al. |

(Continued)

FOREIGN PATENT DOCUMENTS

| | | |
|---|---|---|
| CN | 1642055 | 7/2005 |
| JP | 2002094451 | 3/2002 |
| RU | 2326434 | 6/2008 |
| WO | 2008008685 | 1/2008 |

OTHER PUBLICATIONS

U.S. Appl. No. 13/147,272, filed Aug. 1, 2011, Lai King Tee.

(Continued)

*Primary Examiner* — Diane Lo
(74) *Attorney, Agent, or Firm* — Meyertons, Hood, Kivlin, Kowert & Goetzel, P.C.

(57) ABSTRACT

Neighbor cell hearability can be improved by including an additional reference signal that can be detected at a low sensitivity and a low signal-to-noise ratio, by introducing non-unity frequency reuse for the signals used for a time difference of arrival (TDOA) measurement, e.g., orthogonality of signals transmitted from the serving cell sites and the various neighbor cell sites. The new reference signal, called the TDOA-RS, is proposed to improve the hearability of neighbor cells in a cellular network that deploys 3GPP EUTRAN (LTE) system, and the TDOA-RS can be transmitted in any resource blocks (RB) for PDSCH and/or MBSFN subframe, regardless of whether the latter is on a carrier supporting both PMCH and PDSCH or not. Besides the additional TDOA-RS reference signal, an additional synchronization signal (TDOA-sync) may also be included to improve the hearability of neighbor cells.

14 Claims, 13 Drawing Sheets

(56) References Cited

U.S. PATENT DOCUMENTS

| | | |
|---|---|---|
| 2004/0166887 A1 | 8/2004 | Laroia et al. |
| 2005/0003831 A1 | 1/2005 | Anderson |
| 2008/0108319 A1 | 5/2008 | Gallagher |
| 2009/0011767 A1 | 1/2009 | Malladi et al. |
| 2010/0195566 A1 | 8/2010 | Krishnamurthy et al. |
| 2010/0279707 A1 | 11/2010 | Fischer et al. |
| 2011/0244884 A1 | 10/2011 | Kangas et al. |

OTHER PUBLICATIONS

Notice of Allowance from Korean Application No. 10-2011-7020767, issued Nov. 18, 2014, English and Korean versions, pp. 1-8.

Notice of Allowance from Russian Application Serial No. 2412199059RU/8132, issued Jul. 25, 2014, English and Russian versions, pp. 1-17.

Office Action from Japanese Application No. 2011-549169, issued Jul. 26, 2014, English and Japanese versions, pp. 1-16.

"Improving the hearability of LTE Positioning Service", Alcatel-Lucent, 3GPP TSG RAN WG1 #55bis, Jan. 12-16, 2009, pp. 1-5.

Ericsson: "On OTDOA method for LTE Positioning," RSG-RAN WG1 #56, R1-090918, Athens, Greece, Feb. 9-13, 2009, pp. 1-6.

Nortel: "LTE neighbor cell hearability," 3GPP TSG-RAN1 #56, R1-090765, Athens, Greece, Feb. 9-13, 2009, pp. 1-10.

Qualcomm Europe: "On OTDOA in LTE," 3GPP TSG-RAN WG1 #55bis, Ljubljana, Slovenia, Jan. 12-19, 2009, pp. 1-8.

Extended European Search Report for European Patent Application No. 10738886.0, May 11, 2016, pp. 1-9.

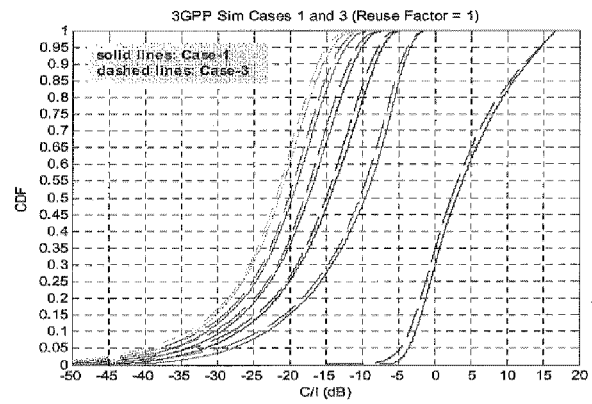
Figure 1: C/I distributions of 6 best sites detected by a uniformly-dropped UE (Reuse Factor = 1).
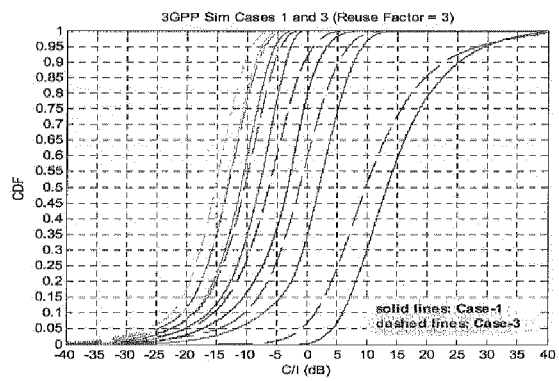
Figure 2: C/I distributions of 6 best sites detected by a uniformly-dropped UE (Reuse Factor = 3).
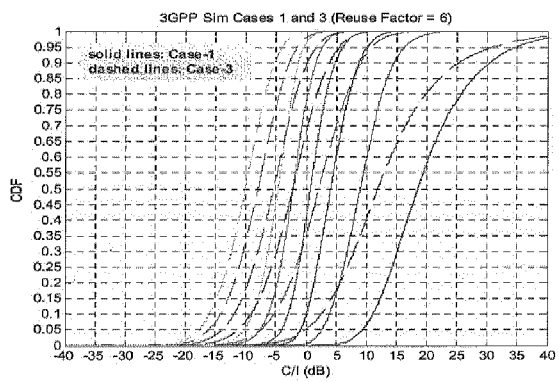
Figure 3: C/I distributions of 6 best sites detected by a uniformly-dropped UE (Reuse Factor = 6).

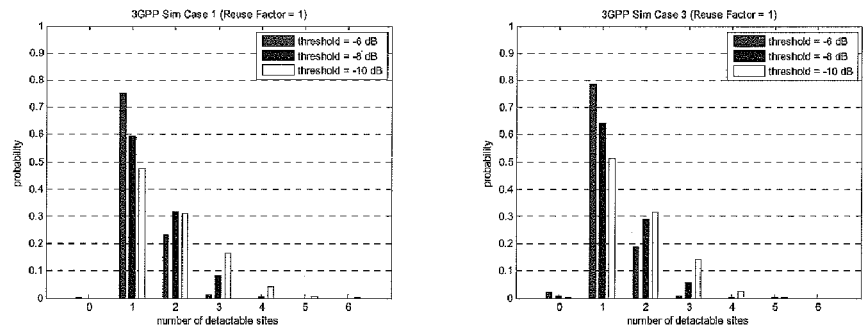
Figure 4: Distributions of number of detectable sites (Reuse Factor = 1).
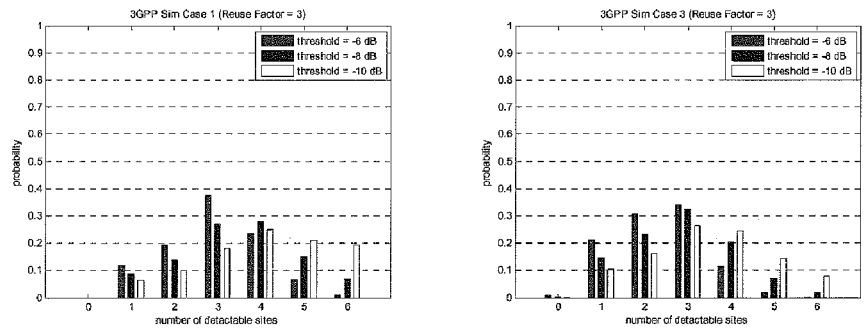
Figure 5: Distributions of number of detectable sites (Reuse Factor = 3).
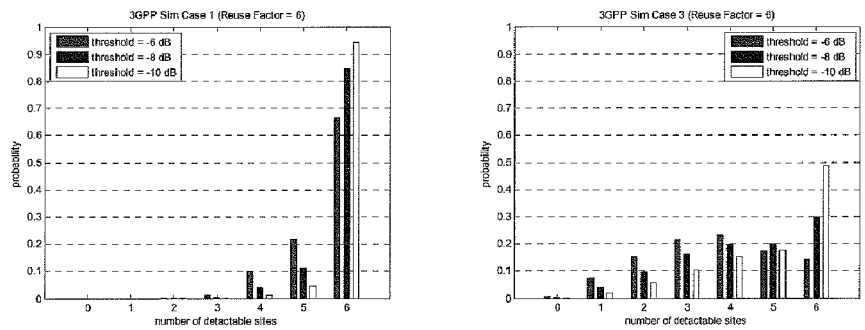
Figure 6: Distributions of number of detectable sites (Reuse Factor = 6).

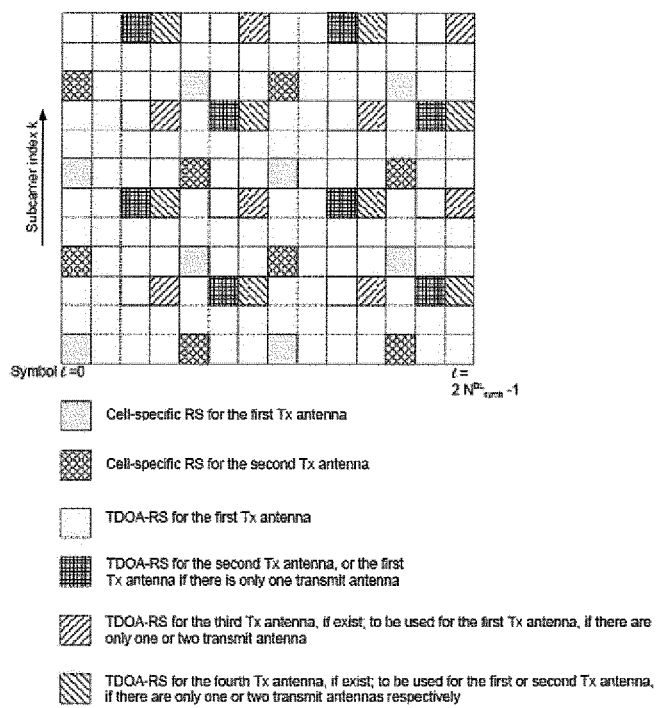
Figure 7     Proposed TDOA-RS structure

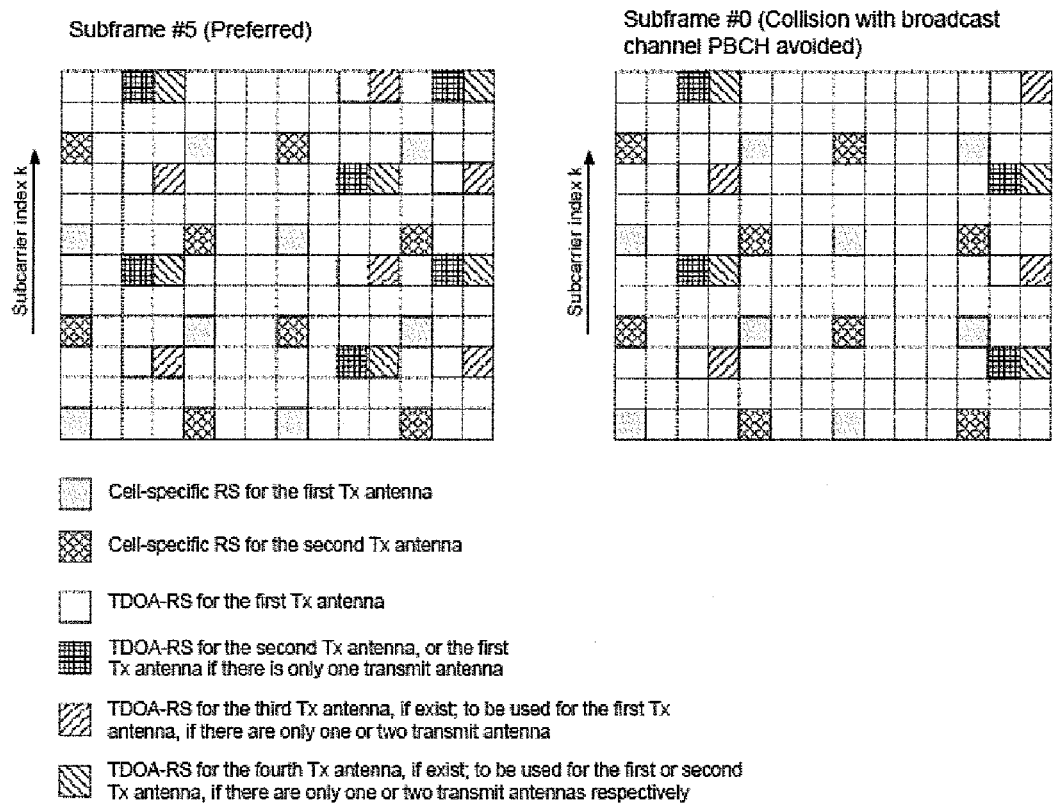
Figure 8 TDOA-RS pattern for transmission in the same resource blocks as the synchronization channel

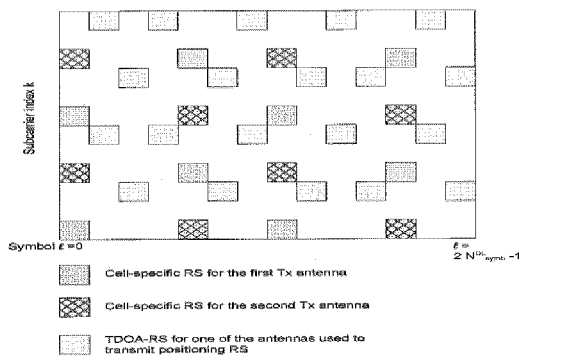
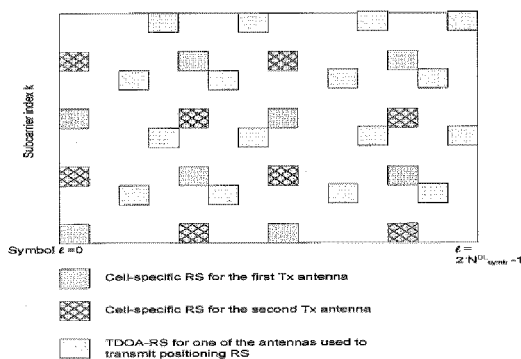
The sequences used for positioning RS can be similar to that used for the CRS. Alternatively, other pseudo-random sequences may also be used, e.g., Zadoff-Chu sequences.
Figure 9C
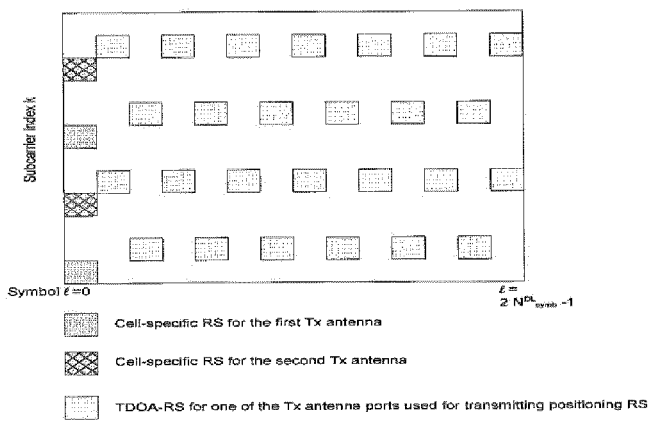
Figure 9D

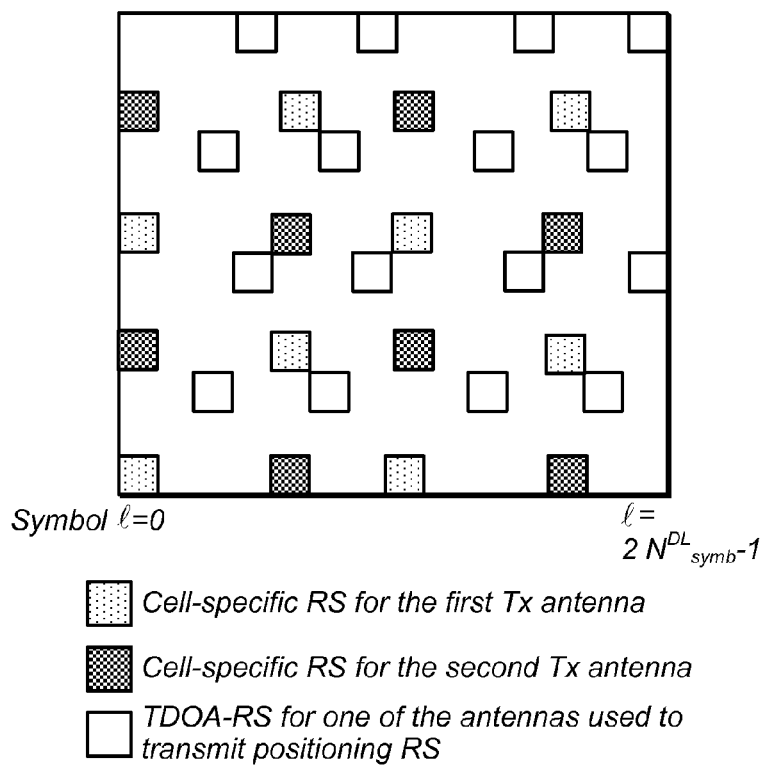

Symbol $\ell=0$   $\ell = 2N^{DL}_{symb}-1$

▨ Cell-specific RS for the first Tx antenna

▦ Cell-specific RS for the second Tx antenna

☐ TDOA-RS for one of the antennas used to transmit positioning RS

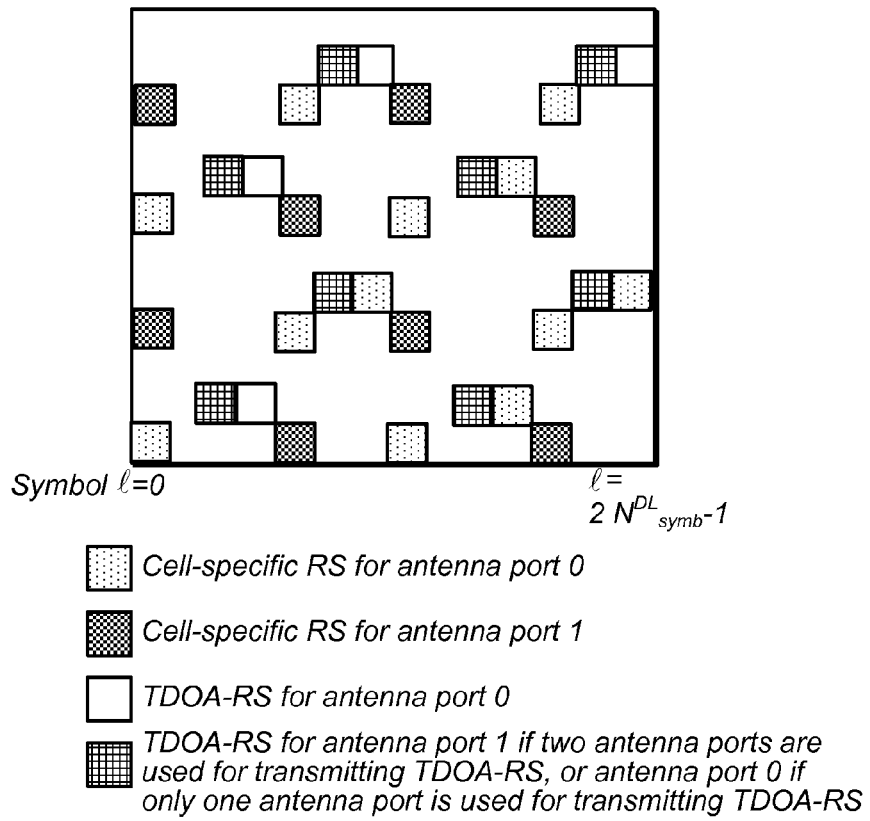

Symbol $\ell=0$   $\ell = 2N^{DL}_{symb}-1$

▨ Cell-specific RS for antenna port 0

▦ Cell-specific RS for antenna port 1

☐ TDOA-RS for antenna port 0

▦ TDOA-RS for antenna port 1 if two antenna ports are used for transmitting TDOA-RS, or antenna port 0 if only one antenna port is used for transmitting TDOA-RS

*FIG. 9G*

METHOD AND SYSTEM FOR USER EQUIPMENT LOCATION DETERMINATION ON A WIRELESS TRANSMISSION SYSTEM

CROSS-REFERENCE TO RELATED APPLICATIONS

This application is a continuation of U.S. patent application Ser. No. 13/147,272, filed Aug. 1, 2011, entitled "METHOD AND SYSTEM FOR USER EQUIPMENT LOCATION DETERMINATION ON A WIRELESS TRANSMISSION SYSTEM," which is a Submission Under 35 U.S.C. §371 for U.S. National Stage patent application of International Application No. PCT/US10/00446, of the same title, filed Feb. 5, 2010, which claims priority to U.S. Provisional Application Ser. No. 61/174,333, filed Apr. 30, 2009, U.S. Provisional Application Ser. No. 61/168,087, filed Apr. 9, 2009, and U.S. Provisional Application Ser. No. 61/150,137, filed Feb. 5, 2009; the disclosures of each of the above-referenced applications are incorporated by reference in their entireties as though fully and completely set forth herein.

TECHNICAL FIELD OF THE INVENTION

This application relates to wireless communication techniques in general, and to determining position of user equipment using positioning reference signals in particular.

BACKGROUND OF THE INVENTION

There is an increasing demand on mobile wireless operators to provide voice and high-speed data services, and at the same time, mobile network operators wish to support more users per basestation to reduce overall network costs and make services more affordable to subscribers. As a result, wireless systems that enable higher data rates and higher capacities to the user equipment are needed. The available spectrum for wireless services is limited, however, and the prior attempts to increase traffic within a fixed bandwidth have increased interference in the system and degraded signal quality.

Various schemes have been implemented on orthogonal frequency domain multiple access (OFDMA) systems to increase system performance. Technologies like multiple input multiple output (MIMO), orthogonal frequency division multiplexing (OFDM), and advanced error control codes enhance per-link throughput, but these technologies do not solve all problems encountered in the communication network.

Wireless communications networks are typically divided into cells, with each of the cells further divided into cell sectors. A base station transceiver unit is provided in each cell to enable wireless communications with mobile stations located within the cell site location. Reference signals are transmitted from cell site base station transceivers on the cell site where the user equipment is located (eNodeB or serving cell sites), as well as being transmitted from base station transceivers on various neighbor cell sites (neighbor cell sites) located around the serving cell site.

Reference signals are used by user equipment on an Orthogonal Frequency-Division Multiple Access (OFDMA) system, such as a 3GPP and LTE mobile wireless communication systems, to assist in establishing the location of user equipment on the mobile wireless communication system. In one form of location analysis, the user equipment uses the reference signals received from the serving and neighboring cell sites to determine the user equipment location to determine a time difference of arrival between reference signals transmitted from the serving cell site and the neighbor cell sites. By calculating a time difference of arrival for the reference signals, the user equipment or other components on the network can perform a triangulation calculation to accurately determine the location of the user equipment on the network. That location information is used to adjust the power of transmission signals to and from the user equipment so as to reduce interference with other signals on the network and improve the overall accuracy of the signal transmissions to and from the user equipment.

Neighbor cell hearability is the ability of the user equipment to detect, or "hear," reference signals from neighbor cell sites. Reference signals from the serving cell sites and neighboring cell sites, however, must be accurately detected, or "heard," by user equipment in order to be used in the location analysis. One problem encountered in neighbor cell hearability arises when user equipment is located near to the center of the serving cell site such that reference signals from neighbor cell sites are too weak for proper detection by the user equipment. In this situation, the reference signals from neighbor cell sites is too weak for the user equipment to accurately estimate the time difference of arrivals between the reference signal from the serving and various neighbor cell sites, which hinders the triangulation location analysis conducted by the user equipment.

Known prior art systems and proposals do not adequately address the neighbor cell hearability problem that arises when user equipment is located near to the center of the serving cell site, and these known systems and proposals include the following: (1) 3GPP TS 36.133 v8.4.0, "E-UTRA Requirements for support of radio resource management," (2) 3GPP TS 36.214 v8.5.0, 'E-UTRA; Physical layer measurements', December 2008, (3) 3GPP TS 36.211 v8.5.0, 'E-UTRA: Physical channels and modulation', December 2008, (4) R1-090053, 'Improving the hearability of LTE Positioning Service', Alcatel-Lucent, RAN155bis, Ljubljana, Slovenia, January 2009, [1](5) R1-090321 'Positioning Support for LTE Rel-9—RAN1 Specific Issues', Motorola, RAN155bis, Ljubljana, Slovenia, January 2009, and (6) R1-090353, 'On OTDOA in LTE', Qualcomm Europe, RAN1-55bis, Ljubljana, Slovenia, January 2009 [3].

In reference (4) and (6) identified above, different additional reference signal patterns are proposed, but both these proposals do not provide a workable or improved solution for the neighbor cell hearability problem when user equipment is located near the serving cell site.

In reference proposal (4) identified above, one resource block (RB) for transmitting a new reference signal RS pattern, called the LCS-RS, must be scheduled. However, the joint scheduling of the resource block RB for transmitting the reference signal (LCS-RS) requires coordination between various neighbor cell sites which is not currently supported by network communication systems. Further, reference proposal (4) above requires the cell sites to be synchronous, the new reference signal LCS-RS pattern has a different structure as compared to the cell-specific reference signal RS, called the CRS that is defined in the current specification. Lastly, collisions between clusters of neighbor cells may still arise unless coordination is done extensively over a larger cluster of the network. In order to implement this proposal identified by reference (4) above, a new type of reference signal is required that is not recognized by the current network systems and large scale synchronous coordination of system components would need to be coordinated. This proposal, therefore, requires changes to the existing system that are too extensive to be workable or practical.

With respect to the reference proposal (6) identified above, the proposed reference signal (E-IRDL RS) follows a very different structure as compared to that of the cell-specific reference signal (CRS) in the existing standard, which requires the introduction of new, and complex, technology in the receivers. In order to implement this proposal identified by reference (6) above, a new type of reference signal is required that is not recognized by the current network systems and the implementation of new technology in receivers would be required. This proposal, therefore, also requires changes to the existing system that are too extensive to be workable or practical.

Simulations were also conducted on the reference proposals (4), (5) and (6) identified above in a multi-cell, multi-sector deployment scenario, with user equipment simulated to be located with uniform randomness in the serving cell site. 3GPP simulation results for Cases 1 and 3 are shown below with an FDD intra-frequency measurement sensitivity requirement is set to be SGH_RP˜126 dBm as defined in 3GPP TS 36.133 v8.4.0, "E-UTRA Requirements for support of radio resource management."

In the simulations, reuse mechanisms could be achieved in frequency, time, and/or code domain, but no specific reuse mechanism has been assumed. The simulations did, however, assume reuse factors of 1, 3 and 6. The Gil distributions of best N neighbor cell signals as observed by each UE are captured and plotted as shown in FIGS. 1-3. The geometry (Gil) distribution of the signal from the serving cell is also plotted for comparison. The cell hearability requirement defined in 3GPP TS 36.133 v8.4.0, "E-UTRA Requirements for support of radio resource management" is SCH E=˜6 dB. In the present simulation study, hearability C/I requirements are assumed to be −6, −8 or −10 dB. The distribution of the number of neighbor cells with detectable signal are plotted as shown in FIGS. 4-6.

From the simulation data taken, the applicants observed the following:

For a Reuse Factor of 1, the probability that a UE can detect 3 or more sites is less than 20%, even when ISO=500 m (Case 1) the hearability CII threshold is as low as ~10 dB:

For a Reuse Factor of 3:
 In Case 1, UE can detect 3 or more sites with probability of about 69% when CII threshold is ~6 dB, 77% at ~8 dB, and 85% at ~10 dB:
 In Case 3, UE can detect 3 or more sites with probability of about 48% when CII threshold is ~6 dB, 62% at ~8 dB, and 73% at ~10 dB;

For a Reuse Factor of 6:
 In Case 1, UE can detect 3 or more sites with probability of about 98% when CII threshold is −6 dB; and,
 In Case 3, UE can detect 3 or more sites with probability of about 77% when CII threshold is −6 dB, 86% at −8 dB, and 92% at −10 dB.

Improving the accuracy in the calculation of the time difference of the serving cell site reference signal and the neighboring cell site will result in an improvement in the accuracy of the location determinations, which will result in enhanced system performance and a reduction of lost data and control signals to and from the user equipment. Increasing the accuracy of the triangulation calculation without requiring extensive system changes or requiring wholesale changes to the reference band or reference signals is needed. Put another way, an improvement in the accuracy of the user equipment positioning analysis when the user equipment is located near the serving cell site is needed, where the improvement attempts to work within the constraints of the existing deployed 3GPP and LTE system and without requiring extensive system changes or new hardware deployment. Based on simulation analysis and comparative studies done on the existing systems and proposals, there is a need to improve the positioning-assisting reference signals so more accurate user equipment positioning can be achieved.

The various components on the system may be called different names depending on the nomenclature used on any particular network configuration or communication system. For instance, "user equipment" encompasses PC's on a cabled network, as well as other types of equipment coupled by wireless connectivity directly to the cellular network as can be experienced by various makes and models of mobile terminals ("cell phones") having various features and functionality, such as Internet access, e-mail, messaging services, and the like.

Further, the words "receiver" and "transmitter" may be referred to as "access point" (AP), "basestation," and "user" depending on which direction the communication is being transmitted and received. For example, an access point AP or a basestation (eNodeB or eNB) is the transmitter and a user is the receiver for downlink environments, whereas an access point AP or a basestation (eNodeB or eNB) is the receiver and a user is the transmitter for uplink environments. These terms (such as transmitter or receiver) are not meant to be restrictively defined, but could include various mobile communication units or transmission devices located on the network.

SUMMARY OF THE INVENTION

Neighbor cell hearability can be improved by including an additional reference signal that can be detected at a low sensitivity and a low signal-to-noise ratio, by introducing non-unity frequency reuse for the signals used for a time difference of arrival (TDOA) measurement, e.g., orthogonality of signals transmitted from the serving cell sites and the various neighbor cell sites. The new reference signal, called the TDOA-RS, is proposed to improve the hearability of neighbor cells in a cellular network that deploys 3GPP EUTRAN (LTE) system, and the TDOA-RS can be transmitted in any resource blocks (RB) for PDSCH and/or MBSFN subframe, regardless of whether the latter is on a carrier supporting both PMCH and PDSCH or not.

Besides the additional TDOA-RS reference signal, an additional synchronization signal (TDOA-sync) may also be included to improve the hearability of neighbor cells. This modified or new TOOA-sync signal can be transmitted in the OFDM symbols sharing the same resource blocks RBs as the synchronization channel. To increase the orthogonality, different cell sites may use different OFOM symbols to transmit this TDOA-sync signal.

The synchronization signals can also be extended (TDOA-sync) to maintain orthogonality between cell sites, with orthogonal or low correlation property through the primary and secondary synchronization signals as defined in Release-8 standards, 3GPP TS 36.211v8.5.0. The resource blocks (RB) carrying these additional signals can be transmitted by hopping through different frequency resources between subsequent transmission instances. Alternatively, they can also hop within the resource blocks used for synchronization signals. i.e., when they are transmitted in the same resource blocks RBs as the synchronization channel.

BRIEF DESCRIPTION OF THE DRAWINGS

Embodiments of the present application will now be described, by way of example only, with reference to the accompanying drawing figures, wherein:

FIG. 1-6 are charts showing performance characteristics based on simulation results.

FIG. 7-9G are schematics diagrams of block assignments in a transmission signal;

Like reference numerals are used in different figures to denote similar elements.

DETAILED DESCRIPTION OF THE PREFERRED EMBODIMENTS

Figure 9A:
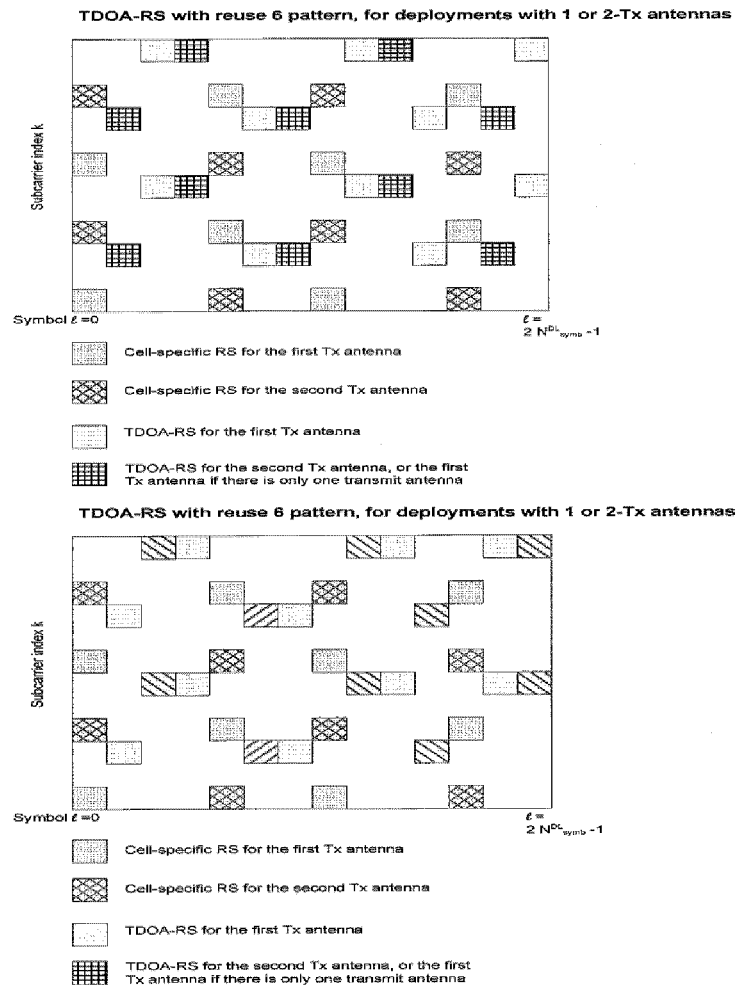
Figure 9B:
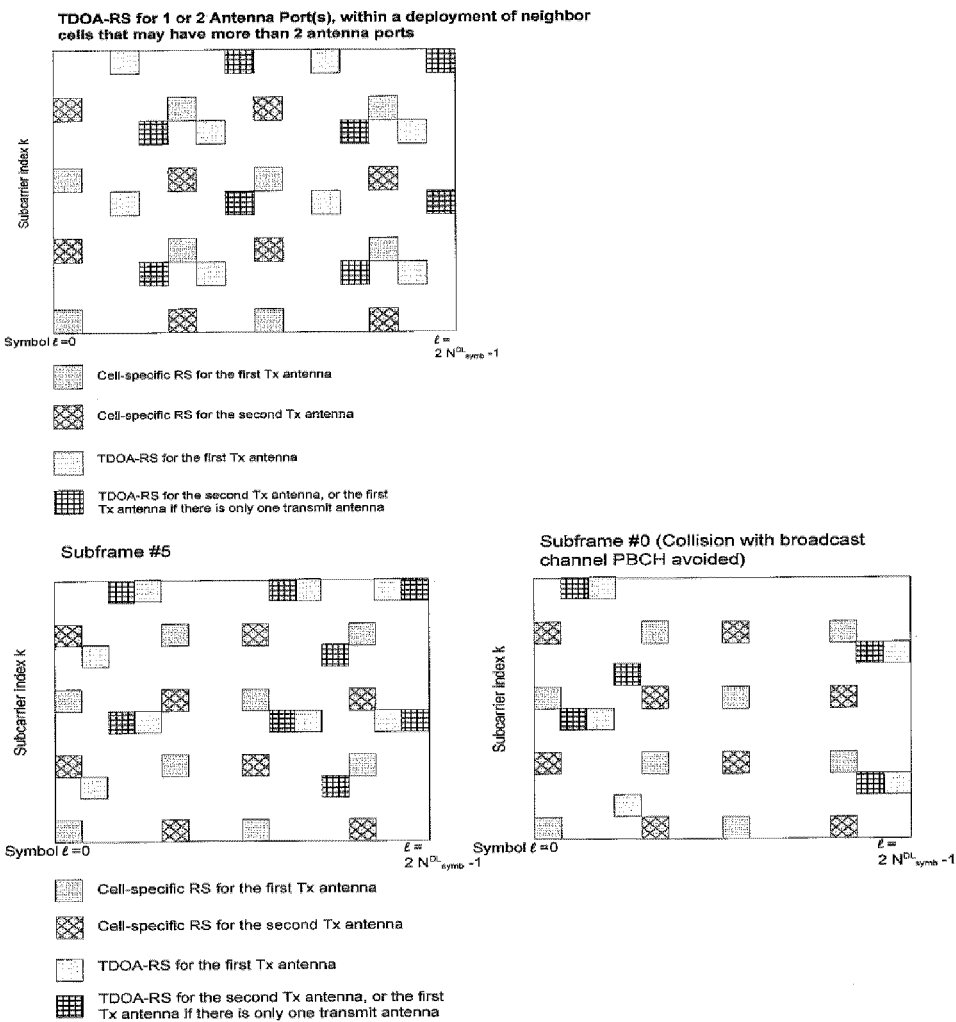
Figure 9E:
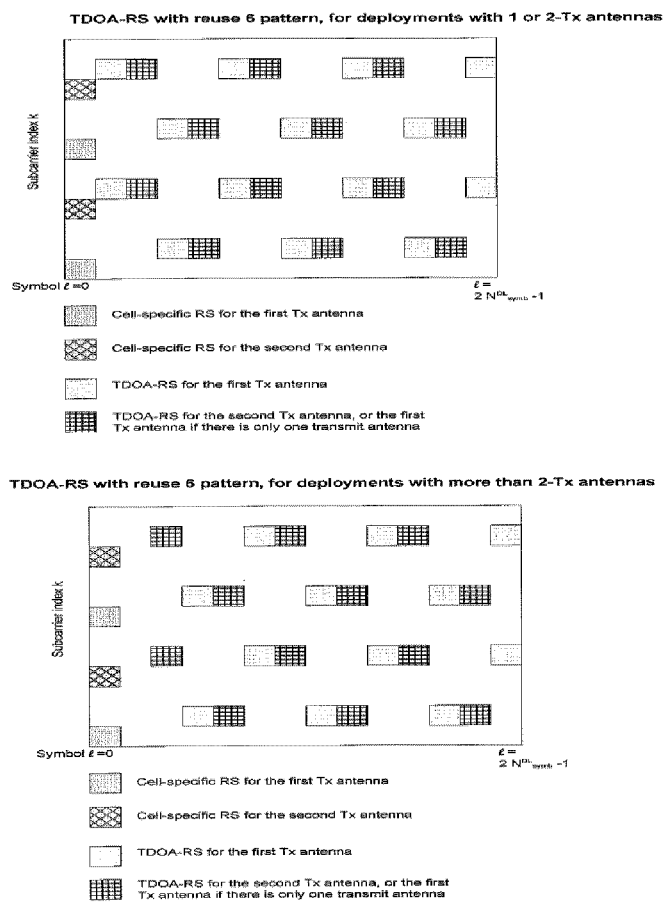

Referring to FIG. 8, the block diagram shows a base station controller (BSC) 10 which controls wireless communications within multiple cells 12, which cells are served by corresponding basestations (BS) 14. In some configurations, each cell is further divided into multiple sectors 13 or zones. In general, each base station 14 facilitates communications using OFDM with mobile and/or wireless terminals 16, which are within the cell 12 associated with the corresponding base station 14. The movement of the mobile terminals 16 in relation to the base stations 14 results in significant fluctuation in channel conditions.

As illustrated, the base stations 14 and mobile terminals 16 may include multiple antennas to provide spatial diversity for communications. In some configurations, relay stations 15 may assist in communications between base stations 14 and wireless terminals 16. Wireless terminals 16 can be handed from any cell 12, sector 13 zone, base station 14 or relay 15 to another cell 12, sector 13 zone, base station 14 or relay 15. In some configurations, base stations 14 communicate with each and with another network (such as a core network or the internet) over a backhaul network 11.

The hearability problem solved by the present invention occurs when the mobile terminal MS 16 is located in close proximity to the basestation transceiver unit BS 14. Without the use the present invention, the mobile terminal MS 16 would encounter problems with its triangulation analysis, which would lead to problems with providing accurate location or proximity data to the system. The invention solves this hearability problem by using a reference signal (TDOA-RS) and an additional reference synchronization signal (TDOA-sync). Neighbor cell hearability can be improved by including an additional reference signal that can be detected at a low sensitivity and a low signal-to-noise ratio, by introducing non-unity frequency reuse for the signals used for a time difference of arrival (TDOA) measurement, e.g., orthogonality of signals transmitted from the serving cell sites and the various neighbor cell sites. The new reference signal, called the TDOA-RS, is proposed to improve the hearability of neighbor cells in a cellular network that deploys 3GPP EUTRAN (L TE) system, and the TDOA-RS can be transmitted in any resource blocks (RB) for PDSCH and/or MBSFN subframe, regardless of whether the latter is on a carrier supporting both PMCH and PDSCH or not.

An additional synchronization signal (TDOA-sync) may also be included to improve the hearability of neighbor cells. This TOOA-sync signal can be transmitted in the OFDM symbols sharing the same resource blocks RBs as the synchronization channel. To increase the orthogonality, different cell sites may use different OFOM symbols to transmit this TDOA-sync signal. The synchronization signals can also be extended (TDOA-sync) to maintain orthogonality between cell sites, with orthogonal or low correlation property through the primary and secondary synchronization signals as defined in Release-8 standards, 3GPP TS 36.211v8.5.0. The resource blocks (RB) carrying these additional signals can be transmitted by hopping through different frequency resources between subsequent transmission instances. Alternatively, they can also hop within the resource blocks used for synchronization signals, i.e., when they are transmitted in the same resource blocks RBs as the synchronization channel.

With reference to FIG. 9, an example of a base station 14 is illustrated. The base station 14 generally includes a control system 20, a baseband processor 22, transmit circuitry 24, receive circuitry 26, multiple antennas 28, and a network interface 30. The receive circuitry 26 receives radio frequency signals bearing information from one or more remote transmitters provided by mobile terminals 16 (illustrated in FIG. 3) and relay stations 15 (illustrated in FIG. 4). In addition to the components shown in FIG. 9, a low noise amplifier and a filter may cooperate to amplify and remove broadband interference from the signal for processing. Further, downconversion and digitization circuitry will then downconvert the filtered, received signal to an intermediate or baseband frequency signal, which is then digitized into one or more digital streams.

The baseband processor 22 processes the digitized received signal to extract the information or data bits conveyed in the received signal. This processing typically comprises demodulation, decoding, and error correction operations. As such, the baseband processor 22 is generally implemented in one or more digital signal processors (DSPs) or application-specific integrated circuits (ASICs). The received information is then sent across a wireless network via the network interface 30 or transmitted to another mobile terminal 16 serviced by the base station 14, either directly or with the assistance of a relay 15.

On the transmit side, the baseband processor 22 receives digitized data, which may represent voice, data, or control information, from the network interface 30 under the control of control system 20, and encodes the data for transmission. The encoded data is output to the transmit circuitry 24, where it is modulated by one or more carrier signals having a desired transmit frequency or frequencies. A power amplifier may also be used will amplify the modulated carrier signals to a level appropriate for transmission, and deliver the modulated carrier signals to the antennas 28 through a matching network (not shown). Modulation and processing details are described in greater detail below.

Figure 10:
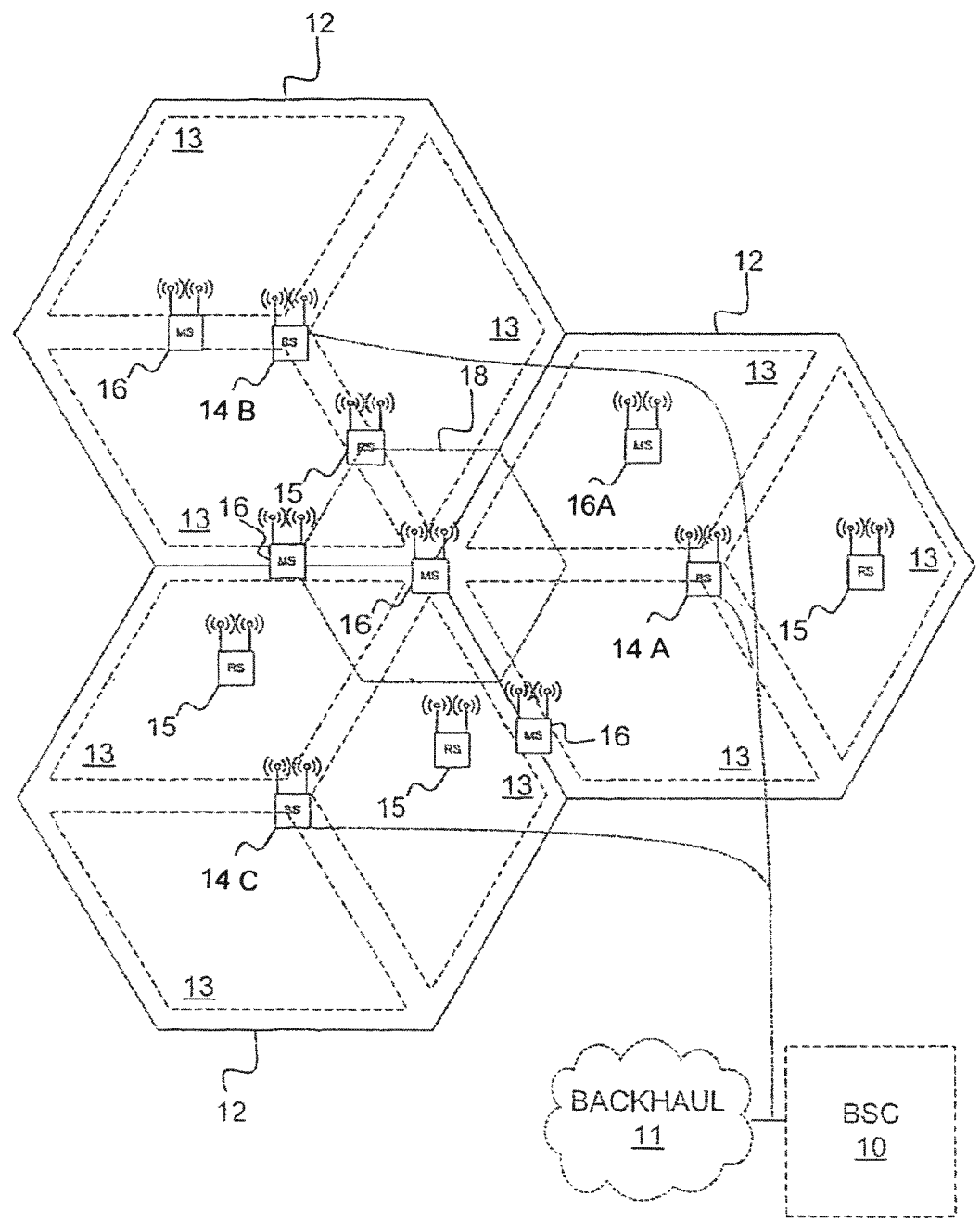
FIG. 10 through 12 are network component diagrams for components on the communications network.
Figure 11:
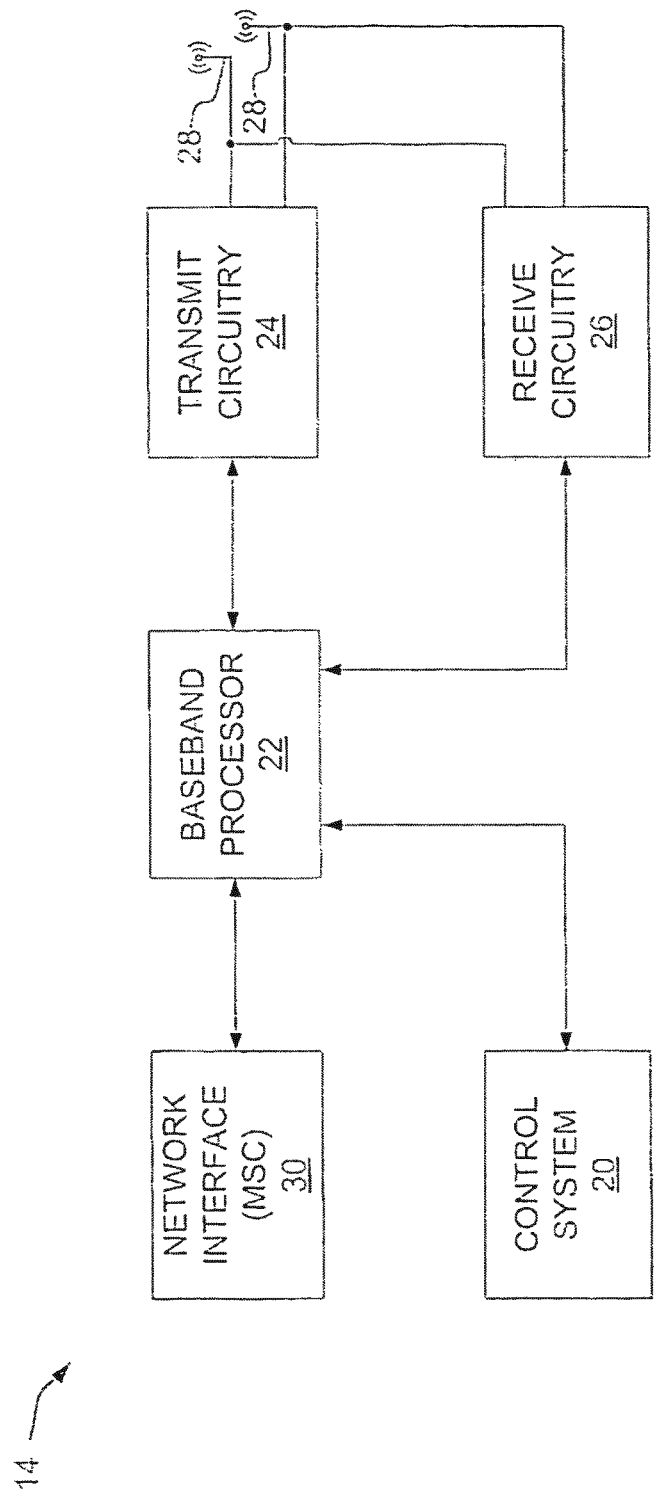
Figure 12:
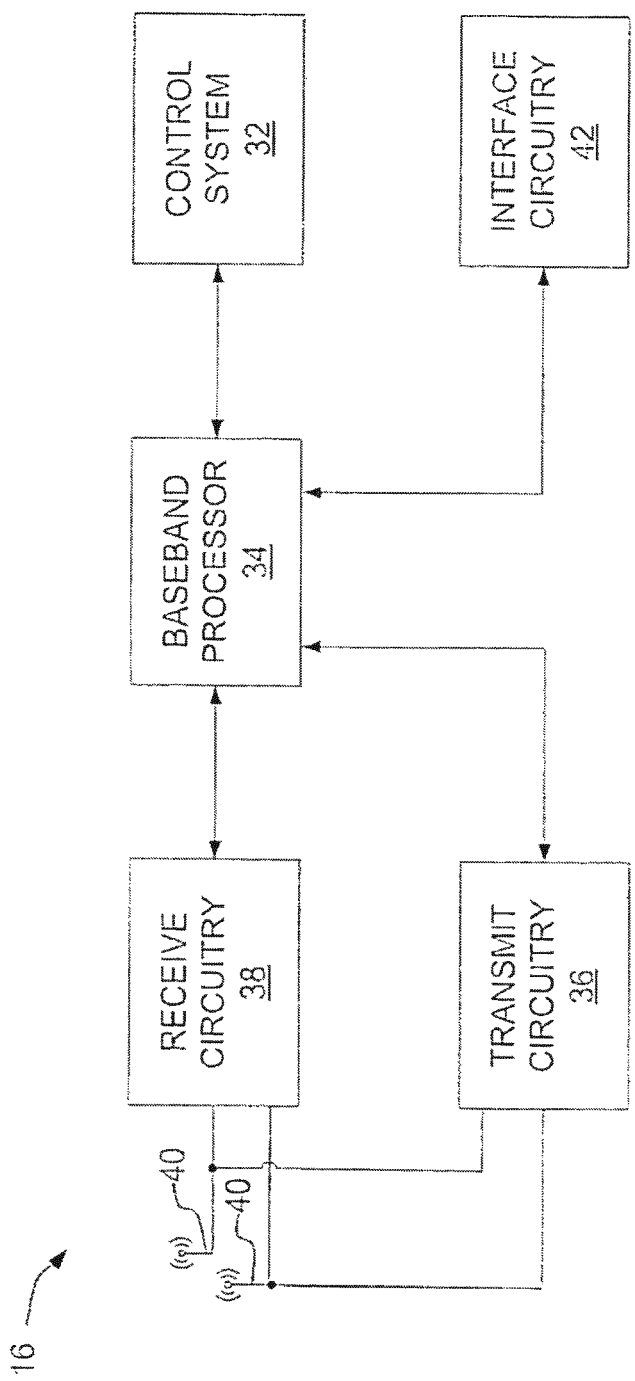

With reference to FIG. 10, an example of a user equipment or mobile terminal 16 is illustrated. Similar to the base station 14, the mobile terminal 16 will include a control system 32, a baseband processor 34, transmit circuitry 36, receive circuitry 38, multiple antennas 40, and user interface circuitry 42. The receive circuitry 38 receives radio frequency signals bearing information from one or more base stations 14 and relays 15. A low noise amplifier and a filter may cooperate to amplify and remove broadband interference from the signal for processing. Downconversion and digitization circuitry will then downconvert the filtered, received signal to an intermediate or baseband frequency signal, which is then digitized into one or more digital streams.

The baseband processor 34 processes the digitized received signal to extract the information or data bits conveyed in the received signal. This processing typically comprises demodulation, decoding, and error correction operations. The baseband processor 34 is generally implemented in one or more digital signal processors (DSPs) and application specific integrated circuits (ASICs).

For transmission, the baseband processor 34 receives digitized data, which may represent voice, video, data, or control information, from the control system 32, which it encodes for transmission. The encoded data is output to the transmit circuitry 36, where it is used by a modulator to modulate one or more signals that is at a desired transmit frequency or frequencies. A power amplifier can also be used to amplify the modulated carrier signals to a level appropriate for transmission, and deliver the modulated carrier signal to the antennas 40 through a matching network.

Various modulation and processing techniques available to those skilled in the art are used for signal transmission between the mobile terminal and the base station, either directly or via the relay station. In OFDM modulation, the transmission band is divided into multiple, orthogonal carrier waves. Each carrier wave is modulated according to the digital data to be transmitted. Because OFDM divides the transmission band into multiple carriers, the bandwidth per carrier decreases and the modulation time per carrier increases. Since the multiple carriers are transmitted in parallel, the transmission rate for the digital data, or symbols, on any given carrier is lower than when a single carrier is used.

Reference signals are used by user equipment, such as mobile terminal MS 16, on an Orthogonal Frequency-Division Multiple Access (OFDMA) system, such as a 3GPP and LTE mobile wireless communication systems, to assist in establishing the location of user equipment on the mobile wireless communication system. As shown in FIG. 10 and using one form of location analysis, the user equipment MS 16A uses the reference signals received from the serving cell site controller BS 14A and neighboring cell sites BS 14B and/or 14C to determine the user equipment location based on a time difference of arrival analysis using the time difference reference signals transmitted from the serving cell site BS 14A and the neighbor cell sites BS 14B and/or 14C.

By calculating a time difference of arrival for the reference signals, the user equipment MS 16A or other components on the network can perform a triangulation calculation to accurately determine the location of the user equipment MS 16A on the network. That location information is used to adjust the power of transmission signals to and from the user equipment MS 16A so as to reduce interference with other signals on the network and improve the overall accuracy of the signal transmissions to and from the user equipment.

Neighbor cell hearability is the ability of the user equipment to detect, or "hear," reference signals from neighbor cell sites BS 14B or 14C. Reference signals from the serving cell sites BS 14A and neighboring cell sites BS 14B or 14C, however, must be accurately detected, or "heard," by user equipment MS 16A in order to be used in the location analysis. One problem encountered in neighbor cell hearability arises when user equipment MS 16A is located near to the center of the serving cell site controller BS 14A such that reference signals from neighbor cell sites BS 14B or 14C are too weak for proper detection by the user equipment. In this situation, the reference signals from neighbor cell sites BS 14B and 14C is too weak for the user equipment to accurately estimate the time difference of arrivals between the reference signal from the serving BS 14A and various neighbor cell sites BS 14B and/or 14C, which hinders the triangulation location analysis conducted by the user equipment MS 16A.

Neighbor cell hearability can be improved by including an additional reference signal that can be detected by user equipment MS 16A at a low sensitivity and a low signal-to-noise ratio, by introducing non-unity frequency reuse for the signals used for a time difference of arrival (TDOA) measurement, e.g., orthogonality of signals transmitted from the serving cell sites and the various neighbor cell sites. The new reference signal, called the TDOA-RS, is proposed to improve the hearability of neighbor cells BS 14B and 14C in a cellular network that deploys 3GPP EUTRAN (LTE) system, and the TDOA-RS can be transmitted in any resource blocks (RB) for PDSCH and/or MBSFN subframe, regardless of whether the latter is on a carrier supporting both PMCH and PDSCH or not.

Besides the additional TDOA-RS reference signal, an additional synchronization signal (TOOA-sync) may also be included to improve the hearability of transmissions from neighbor cells sites BS 14B and 14c. Primary or secondary synchronization signals can be covered or scrambled by a cell-specific orthogonal code such as a Walsh code or other codes with low cross-correlation property. If Walsh code is used, all 1's codewords are reserved in the normal primary or secondary signal. The scrambling is performed on the synchronization sequence before mapping to the resource elements for 10FT processing. Other sequences with orthogonal or low cross-correlation property with the primary or secondary synchronization signals can also be used.

This new TOOA-sync signal can be transmitted in the OFOM symbols sharing the same RBs as the synchronization channel. To increase the orthogonality, different cell sites may use different OFOM symbols to transmit this TOOA-sync signal. For example, depending on the cell 10, the TOOA-sync signal can be transmitted in OFOM symbol e=2, 3, 9, 10, 12 or 13 respectively, in the case of normal CP, Frame structure 1. OFOM symbol e=0, 1, 4, 7 and 11 are reserved for cell-specific RS, while e=5, 6 are reserved for the secondary and primary sync signals respectively in subframe 5. For slot 1 in subframe 0, the TOOA-sync signal cannot be sent in OFOM symbol e=0, 1 . . . 3 to avoid collision with the broadcast channel PBCH, if it is sent in the same resource block RB.

The synchronization signals can also be extended (TDOA-sync) to maintain orthogonality between cell sites, with orthogonal or low correlation property through the primary and secondary synchronization signals. The resource blocks (RB) carrying these additional signals can be transmitted by hopping through different frequency resources between subsequent transmission instances. Alternatively, the TDOA-sync signals can also hop within the resource blocks used for synchronization signals, i.e., when they are transmitted in the same resource blocks RBs as the synchronization channel.

For subframe #0, the TDOA-sync signals should be transmitted on the OFDM symbols not used for broadcast channel PBCR transmissions. The group of 6 resource blocks RBs carrying the primary and secondary synchronization signals and TDOA-sync can also hop to different frequency locations away from the center of the carrier, in the interval between the slots/subframes specified in the current specification Ts 36.211 v8.5.0. This would also help to improve the synchronization performance for users who may experience fading in the center of the band.

The TDOA-RS and TDOA-sync signals may also be transmitted on MBSFN subframes on carriers with or without PDSCR support. Or, they can be scheduled jointly by neighbor cells for transmissions in the same resource block RB as described in other proposals. The periodicity of the subframes carrying TDOA-RS and/or TDOA-sync is configurable, depending on the required TDOA estimation accuracy and the location distribution of the users (UEs or MS 16) in the cell site. Similarly, the number of resource blocks RBs carrying the TDOA-RS in one subframe is also configurable.

Similar to Idle period downlink transmission (IPDL) in UTRAN, groups of resource blocks RBs in a certain subframe can be reserved for exclusive transmissions by different neighboring cell sites BS 14B or BS 14C (except for the CRS signal) or in the data region of MBSFN subframes. The advantage for OFDMA-based EUTRAN (LTE) is that transmissions from multiple neighbor cells BS 14B and BS 14C on these reserved resource blocks RBs can be done simultaneously, as a form of fractional frequency reuse within the subframe or group of subframes for TDOA measurement. These transmissions can be power boosted, with or without additional reference signals. A fractional frequency reuse scheme could be applied to further improve the hearing performance. For example, a special zone can be reserved for the transmission of the additional cell specific sequence where different frequency reuse factors can be configured among the neighboring cells.

We can apply the similar design to relay stations to allow them to monitor their neighboring relay stations, because relay cannot listen (detect SCH from neighbor relay stations) while talking. In addition, the timing differences between different base stations (eNB) in an asynchronous network can be identified through inquiry and responses based on X2 signaling. The relative timing differences between different base stations can be used by the network entity for location determination, e.g. LMU.

To maintain consistency with the cell-specific reference signal RS (CRS) as defined in current Release-8 standard, an alternative structure of the additional TDOA reference signal (TDOA-RS) for UE positioning is shown in FIG. 7, for the case of normal CP. The advantage of similarity in the structure of these TDOA-RS as compared to CRS is that the similar receiver can be used for detecting TDOA-RS. Similar to cell-specific RS, these TDOA-RS are also cell-specific, with the amount of shift as a function of cell 10. A major difference from the standard CRS signaling is that the TDOA-RS configured for antenna ports 1, 2 or 3 can be used by antenna port 0, when there is only a single antenna port. Likewise, when there are two transmit antenna ports only, TDOA-RS for antenna ports 2 and 3 can be used for antenna ports 0 and 1 respectively. TDOA-RS that are transmitted from different antenna ports can be either combined to increase the accuracy of the TDOA estimation.

The TDOA-RS can be transmitted in any resource blocks (RB) for PDSCH and/or MBSFN subframe, regardless of whether the latter is on a carrier supporting both PMCH and PDSCH or not. While the situation is similar for TDOA-sync signals, there is an additional constraint that the TDOA-sync signal has to be transmitted over 6 consecutive RBs in a subframe. The TDOA-sync signal can share the same RB as the primary and secondary synchronization signals. Alternatively, the TDOA-RS can also be transmitted in the RBs that are used for the synchronization channels, with some modifications as shown in FIG. 8.

To exploit frequency diversity gain and to ensure the maximum number of UEs in the cell site can detect the TOOA-RS and TOOA-sync signals, the resource blocks that carry these signals are allowed to hop between transmission instances of the signals. Hopping across the entire band Frequency diversity gain can be maximized by hopping across the entire band, according to a pre-determined cell-specific hopping sequence. In the case of TDOA-RS, one or a few contiguous RBs carrying the TDOA-RS can hop to different frequency resources between consecutive transmit instances.

In the case of TDOA-sync, the group of 6 contiguous RBs carrying the TDOA-sync can hop to different frequency resources, e.g., a different group of 6 contiguous RBs between consecutive transmit instances. In the case of TDOA-RS that shares the same RB as the sync channel, some frequency diversity gain can also be obtained through hopping across those 6 RBs that carry the sync channel.

Depending on the signal sensitivity, TDOA estimation accuracy requirement and UE location distributions in the cell site, the periodicity for transmitting the TDOA-RS and TDOA-sync signals can be configured to transmit in each subframe for a higher signal density, or in the same subframe as the sync signal. Either or both using subframe 0 and 5 in each radio frame.

In the extreme case where the reuse factor is relatively high, the whole resource block RB may be used by one cell sites. Then the additional reference signals can occupy the entire RB, except for the resource elements used for CRS to maintain backward compatibility with Release-B. The reuse factor could be configured by network and be broadcasted by a new SIB message. If FFR is configured, the transmission region for each cell can be determined based on cell ID. Frequency hopping can also be applied on top of FFR, by including a pre-determined cell specific hopping pattern with the configuration message.

In UTRAN, the LMU is responsible to estimate the relative timing offset between the neighbor cells by observing their transmissions. To avoid hearability problem for E-UTRAN at the LMU, an alternative way for the LMU to find out about the relative timing offset between the neighbor cells in an asynchronous system is to have a designated eNB send an inquiry to the neighbor cells on their timing information. If a neighbor eNBs are equipped with a satellite receiver for GPS or GNSS signals, then the neighbor eNB can respond with an absolute timing of the frame boundary, as an example. Otherwise, the neighbor eNB can respond with relative timing information, e.g., time stamp when the inquiry is received from eNB, and the timing offset of the corresponding subframe and SFN at the neighbor eNB. This inquiry and response can be transmitted through X2 signaling. The periodicity of this inquiry will depend on the expected reference clock drifts at the eNB.

To evaluate the performance of a positioning method such as TDOA, the factors that affect the accuracy would need to be captured. Evaluation models should capture the accuracy of TDOA estimation by the UEs, depending on the corresponding location in the cell, e.g., the TDOA estimation error performance as a function of SINR should be plotted and captured in the system level simulation. System simulation is used to evaluate the resultant performance on the estimation of UE location based on triangulation using the TOOA estimations of signals transmitted from various neighbor eNBs The present invention solves hearability problems by using a new reference signal (TDOA-RS) and a new synchronization signal (TDOA-sync) transmitted over a signal structure that is already in use on the EUTRAN 3GPP Release 8 standard, i.e., cell-specific RS and synchronization signals. By using new signals over an existing signal structure, the present invention can be implemented without adding additional receiver complexity in the support of TDOA estimation. Moreover, hopping of the resource blocks that carry the proposed TDOA-RS and TDOA-sync across the frequency domain can exploit frequency diversity, and maximize the hearability in various channel conditions as experienced by different UEs.

The present invention can be used to allow relay station to maintain the on-going measurement of the cell specific sequence sent by its neighboring relay stations. Such measurement can help the scheduling of the base station and cannot rely on the original reference signal (CRS) as defined in Release-8, because the relay station also needs to transmit CRS, especially for synchronous network. This mechanism is useful for the self-organized relay network where the relay station can be added/removed dynamically or relay station is moving.

To support UE location determination through time difference of arrival (TOOA) measurements, additional UE measurement capability should be defined as follows.

The Definition for timing offset measurement, in units of T is the time of arrival of a downlink frame in the neighbor cell (TOA_neighbor) with reference to the time of arrival of the corresponding frame in the serving ceil (TOA_ref), i.e., TOA neighbor—TOA_ref, where T, is the basic time unit for E-UTRA, as defined in TS 36.211 vS.5.0 s11. This modification to the system would be applicable for RRC CONNECTED intra-frequency, RRC CONNECTED inter-frequency.

The reporting format and triggering mechanism of such a measurement will be defined as part of the MAC or RRC layer specifications. One triggering mechanism is based on the triggering of RSRP and RSRQ reporting, as some timing offset information can be made available. In addition, the triggering can be based on the configuration of TOOA-RS and TOOA-sync transmission time, for improved accuracy, especially for UEs located in the cell center. For UEs located near to the cell edge, the timing offset measurement can be reported at the same time as the RSRP and/or RSRQ reports.

Additional positioning reference signals (RS) are proposed which have property of frequency/time/code reuse 6 or greater. This is expected to greatly improve the neighbor cell signal hearability by the UE MS 16 over known methods and systems, which is only supporting reuse—3 in a system deployment with 2 transmit antennas.

Further details have also been provided for the contiguous RS which has a similar structure to the synchronization signals. Avoid interference from neighbor cell transmissions by assigning resources for the positioning RS (TDOA-RS) orthogonally, through time, frequency and code, with an effective reuse factor of 6 or higher. A frequency reuse of 3 has been analyzed, but it is not sufficient to achieve sufficient neighbor cell hearability. Thus, the present invention allows a frequency reuse pattern of 6 in the new positioning-assisting reference signal RS (TDOA-RS). Similar to cell-specific RS (CRS), there is cell-specific frequency shift in the RS pattern: V,shift=N(cell ID) mod 6, as described in Section 6.10.1 of TS 36.211 v8.6.0

The sequences used for positioning RS can be similar to that used for the CRS. Alternatively, other pseudo-random sequences may also be used, e.g., Zadoff-Chu sequences. When MBSFN subframes are used to transmit positioning RS, the cell-specific RS is only transmitted in OFDM symbol 0 of the subframe when one or two transmit antenna ports are configured. Thus, positioning RS can be transmitted in all other OFDM symbols in the subframe. However, OFDM symbol 1 of the subframe cannot be used for positioning RS when more than two transmit antenna ports are configured for some neighbor cells in the deployed network.

The reference signal TDOA-RS can be positioned in contiguous frequency (subcarriers) over a number of resource blocks. In the example as shown in the chart below, each OFDM symbol that has no cell-specific reference signal RS, each spanning over the 6 contiguous resource block RBs, and the TDOA-RS reference signal is allocated to a neighbor cell for the transmission of a cell-specific sequence. These are transmitted on OFDM symbols not used for the synchronization signals and not for the broadcast channel. Data traffic cannot be scheduled on those resource blocks RBs carrying the TDOA-RS positioning reference signal.

If these reference signals RS are transmitted in the same resource blocks RBs and subframe (#5) as the synchronization signals, then there can be at most Nrs=6 OFDM symbols for up to 6 different neighbor cells in deployment networks with more than 2 transmit antennas, and Nrs=8 OFDM symbols for up to 8 different neighbor cells in deployment networks with one or two transmit antennas only. Each neighbor cell can be assigned more than one OFDM symbol for transmitting the positioning sequence. Other subframes and resource blocks that do not carry the synchronization signals (PSS/SSS) may also be used for transmitting the positioning sequence. A larger number of resource blocks RBs or a longer sequence length Nseq can also be supported, e.g., 15 resource blocks RBs as in the 3 MHz bandwidth system with 3.84 MHz sampling rate.

These sequences are orthogonal or have low cross-correlation properties with the primary (PSS) and secondary (SSS) synchronization signals, and between different neighbor cells. One type of sequence that can be used is the CAZAC sequences or Zadoff-Chu sequences that are already used for various reference signals RS. One example is to use different cyclic shifts α of the length—62 primary synchronization signal den) as defined in Release-8 of the 3GPP standard.

$$p(n) = e^{j\alpha} d(n) \text{ where } d_u(n) = \begin{cases} e^{-j\frac{\pi u n(n+1)}{63}} & n = 0, 1, \ldots, 30 \\ e^{-j\frac{\pi u (n+1)(n+2)}{63}} & n = 31, 32, \ldots, 61 \end{cases}$$

The values of cyclic shifts a can be chosen such that they are spaced as far apart as possible for the different neighbor cells. The amount of shifts should be a function of the cell ID. Similarly, the OFDM symbol assigned to a neighbor cell should also be a function of the cell ID. For example.

$$\alpha = N_{int} + N_{ID}^{(1)} \bmod \lfloor (N_{seq}/N_{int}) \rfloor$$

where N>=1: minimum number of samples between each possible cyclic shift values. For example, for Nseq=62, and 6 desirable distinct cyclic shift values, then $$N_{int} \leq \left\lfloor \frac{62}{6} \right\rfloor = 10$$

OFDM symbol assigned to neighbor cell with cell ID:

$$l' = N_{ID}^{cell} \bmod N_{rs}$$

Where l'=OFDM symbols not containing CRS, PSS/SS-SIPBCH, arranged in ascending order of OFDM symbol index 1, starting from 1'=0 to 1'=Nrs−1. For a longer sequence, the ZC sequence of length 127 can be used:

$$d_u(n) = \left\{ e^{-j\frac{\pi u n(n+1)}{127}} \quad n = 0, 1, \ldots, 126 \right.$$

The root of these sequences u can be selected different from the ones used for the shorter sequence or primary sync signal.

Figure 9F:
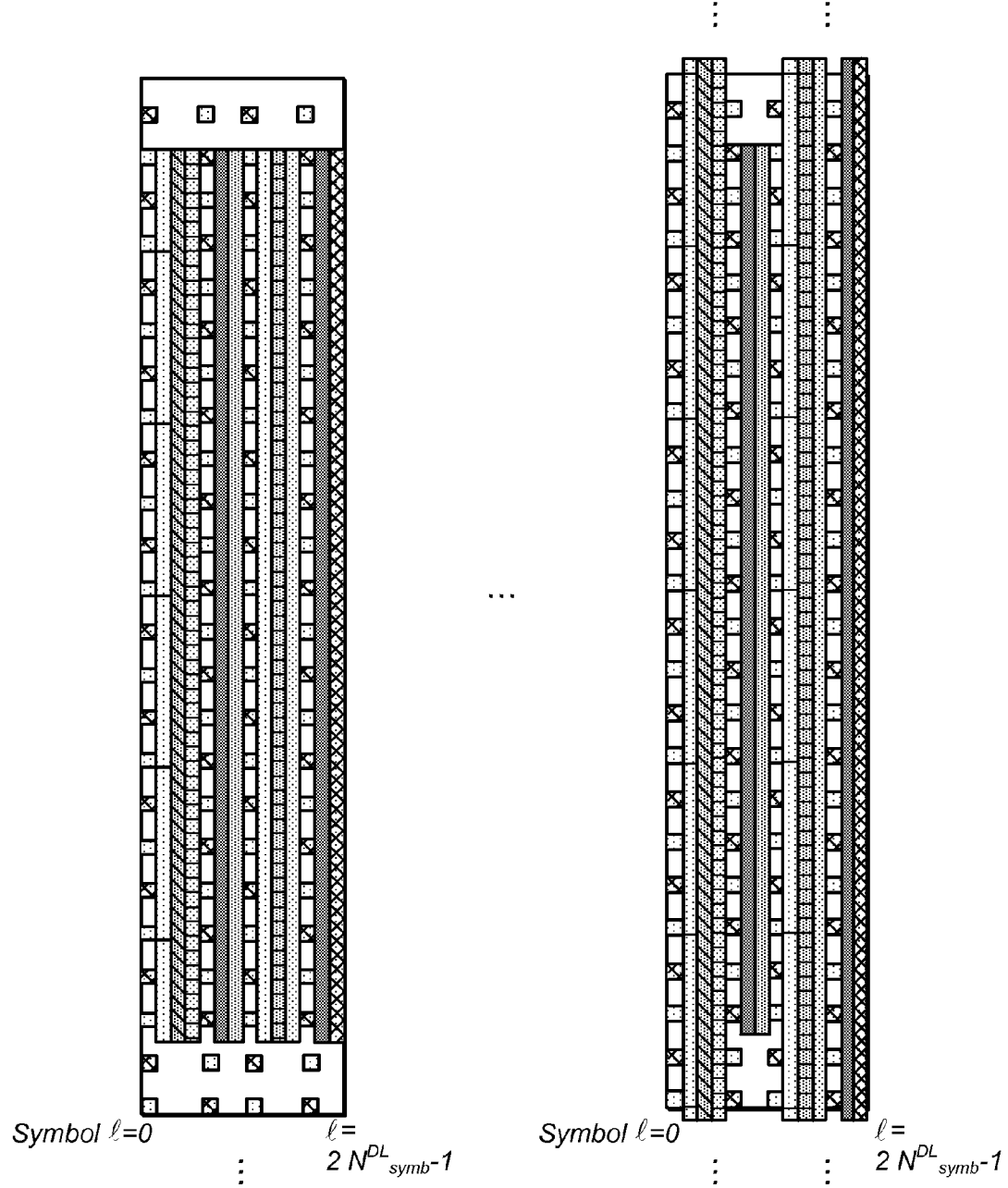

As shown in FIG. 9F, when positioning the TDOA-RS reference signal in a contiguous resource blocks, the TDOA-RS is located in the same subframe as synchronization signals. The left block uses the same length as sync signals, and the right block uses a longer length of reference signal RS sequence that may occupy about 15 RBs in the center of the band. These resource blocks are identified for deployment in networks with more than 2 antennas. An OFDM symbol index 1 in each slot should be reserved and not used for the positioning RS transmission.

Positioning of the TDOA-RS reference signal in a staggered pattern and contiguous pattern is beneficial, with a frequency reuse of 6 and the objective for the staggered pattern. With the use of different OFDM symbols for contiguous positioning of the TDOA-RS transmission with different cyclic shifts from different neighbor cells, a frequency reuse pattern larger than 6 can be achieved.

The TDOA-RS positioning reference signals have been described using a frequency/time/code reuse of 6 or greater. This code reuse is expected to greatly improve the neighbor cell signal hearability by the UE, as compared to that of cell-specific RS in Release-8, which is only supporting reuse—3 in a system deployment with 2 transmit antennas. Further details have also been provided for the contiguous RS which has a similar structure to the synchronization signals.

The present invention will avoid interference from neighbor cell transmissions by assigning resources for the positioning reference signal RS (TDOA-RS) orthogonally, through time, frequency and code, with an effective reuse factor of 6 or higher. During the simulation analysis, it was assumed that the network is synchronized. The mobile terminal UE time difference of arrival was measured based on either Release-8 CRS or proposed PA-RS in designated subframes without data transmission, i.e., IPDL subframes. Furthermore, FDD intra-frequency measurement sensitivity requirement is set to be SCH RP>−126 dBm [6]. Cell detectability requirement is SCH E/Iot>6 dB. Using Rel-8 CRS, it is assumed that signal can be reliably detected down to around −14 dB due to higher CRS symbol density than that of sync signal.

From the simulation results, it is observed that using Release-8 CRS only, UE positioning performance cannot meet the US FCC mandate E911 phase-2 requirement. Positioning accuracy is essentially limited by neighboring cell hearability. For example, for C/me threshold of −14 dB, the saturation point of position error at 83% indicates that the probability that DE cannot detect 3 or more non-co-located sites is 17%.

For the standard shown in Release-8 using a CRS signal, a reuse factor of 3 is achievable for 2 antenna ports in IPDL subframes, i.e., subframes without scheduled data. In case of joint scheduling or configuration of positioning subframes consisting of a mixture of normal and MBSFN subframes for different cell/group of cells, however, a higher reuse factor can be achieved, but only at the expense of increased overhead and complexity. The UE positioning error distributions for 3GPP Simulation Case-1 (ETU 3 kmlh) and Case-2 (ETU 30 kmlh) using Release-8 CRS with a reuse factor of 6 were analyzed, with a C/I threshold for cell hearability is set to be −6, −10, and −14 dB.

From the simulation results, it was also observed that using Release-8 CRS with a reuse factor of 6, UE positioning performance can meet the FCC E911 phase-2 requirement. Furthermore, it can be seen that positioning performance is impacted by the CII threshold for cell hearability. To be specific, setting the C/I threshold to a very low value results in more inaccurate time difference of arrival estimates, which degrades positioning performance. On the other hand, if C/I threshold is set too high, cell hearability will be reduced. Therefore, a C/I threshold can be used to select neighbor cells for inclusion in UE positioning determination, to avoid the degradation in positioning accuracy as caused by TDOA estimates with large errors. The CA threshold needs to be optimized for a trade-off between the TDOA estimation accuracy and the number of neighbor cells used in the positioning determination, i.e., the subsequent trilateration step, from the positioning performance point of view.

PA-RS patterns with a reuse factor of 6 were simulated to analyze the UE positioning error distributions for 3GPP Simulation Case-1 (ETU 3 kmlh) and Case-2 (ETU 30 kmlh) using an additional position reference signal, such as the TDOA-RS or PA-RS reference signal. The simulation was conducted to analyze the additional position reference signal use with 1-Tx or 2-Tx antenna configurations and PA-RS bandwidths of 50, 25, 15 and 6 RBs.

From the simulation results using an additional position reference signal, such as the TDOA-RS or PA-RS, with a reuse factor of 6, it is observed that: (1) UE positioning performance can meet the FCC E911 phase-2 requirement with an additional position reference signal, such as the TDOA-RS or PA-RS, in a bandwidth of 15 RBs and higher in both Case-1 and Case-2; and (2) for a bandwidth of 50 REs, the antenna configuration used to transmit the additional position reference signal, such as the TDOA-RS or PA-RS, has negligible impact on positioning performance. With reduced bandwidth, 2-Tx PA-RS generally improves positioning performance due to diversity.

Using a standard positioning algorithm was adopted to conduct the simulation, and the UE position is determined as follows.

Channel impulse response was estimated from serving and detectable neighboring cells, and it was shown that: (1) if more than one detectable cell are co-located, the one with the best signal quality is employed in positioning, (2) when multiple transmit/receive antennas are deployed, estimated channel taps of all transmit-receive antenna pairs are combined coherently, (3) when both CRS and an additional position reference signal, such as the TDOA-RS or PA-RS are configured, estimated channel taps from CRS and PA-RS are first combined using time-domain interpolation for each Tx antenna port transmitting both CRS and PA-RS. Estimated channel taps of all transmit-receive antenna pairs are then combined coherently, and (4) First arrival tap (path) is identified as the earliest tap in the set of the strongest Ntap taps.

Propagation delay of signal from a cell is determined as the delay of the identified first tap. The time difference of arrival is determined as the difference between delay from neighboring cell and serving cell.

The UE position is estimated from the time difference of arrival of the Nns for neighboring sites with the best signal quality. The number of neighbor cell time difference of arrival measurements is limited by a signal quality threshold, i.e. C/I threshold such that TDOA measurements that are expected to have large errors are not used for position estimation, provided that a minimum number, e.g. 2 or 3, of neighbor cell time difference of arrival measurements are available. A different C/I threshold value may be applicable for a different number of neighbor cell, i.e., there can be multiple CII thresholds.

For example, if there are Nns=5 neighbor cells with C/I exceeding C/I threshold 1 for hearability, the value of C/I threshold 2 for accurate TDOA measurement can be set to a relative higher value than in the case Nns=2. The threshold value settings can be selected based on the TDOA link performance, and the cell-specific C/I threshold is configured by eNB through higher-layer signaling. UE-specific C/I threshold adjustment can also be supported. In this simulation, we assume Ntap=6 and C/I thresholds of −6, −10 and −14 dB.

Based on the applicant's simulation analysis, it is shown that the present invention out-performs the standard Release 8 UE positioning for cell-specific (CRS). The applicant was able to determine that the CRS-based solution has limited positioning performance due to neighboring cell hearability problems. When joint scheduling or configuration of positioning subframes consisting of a mixture of normal and MBSFN subframes among different cells/group of cells, the CRS-based positioning performance can be improved, but only with an increased reuse factor that will increase complexity and overhead on the system.

Cell hearability threshold can be optimized to improve positioning performance. The additional position reference signal, such as the TDOA-RS or PA-RS, design with a reuse factor of 6 provides significantly improved positioning performance over known techniques, and FCC E911 phase-2 requirement can be met with additional position reference signal, such as the TDOA-RS or PA-RS, bandwidth of as low as 15 resource blocks RBs in a 2 transmit antennas system. The impact of the proposed additional position reference signal, such as the TDOA-RS or PA-RS, antenna configuration was analyzed, and it was determined that a 2-Tx antenna configuration for the additional position reference signal, such as the TDOA-RS or PA-RS, improves positioning performance for positioning subframes based on normal subframe with no data or MBSFN subframe with no data and CRS in the data region.

It was also determined that the time difference of arrival estimation accuracy increased as the bandwidth of the positioning assisted reference signal, TDOA-RS or PA-RS, was increased. The positioning assisted reference signal, TDOA-RS or PA-RS does not need a full band, even though the time difference of arrival estimation error is about twice as much with a half band as that for the case of a full-band. The resulting positioning performance after trilateration can still meet FCC requirements.

Two proposed additional position reference signal, such as the TDOA-RS or PA-RS, patterns are shown in FIG. 9G for one antenna and two antenna configurations, respectively.

The above-described embodiments of the present application are intended to be examples only. Those of skill in the art may effect alterations, modifications and variations to the particular embodiments without departing from the scope of the application. In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A system comprising:
a base station configured to communicate with a user equipment device (UE) via a radio access network, the base station comprising:
a radio; and
one or more processing elements operatively coupled to the radio;
wherein the base station is configured to:
transmit a time difference of arrival reference signal (TDOA-RS) that is usable to determine proximity of the UE to the base station, wherein the base station is configured to transmit the TDOA-RS using one or more first transmission resources that are reserved for the base station and not using one or more second transmission resources that are reserved for one or more neighbor base stations;
transmit the TDOA-RS using a first subcarrier within one or more resource blocks for a first transmission instance; and
transmit the TDOA-RS using a second subcarrier and not the first subcarrier within the one or more resource blocks for a second transmission instance.

2. The system of claim 1, wherein the one or more first transmission resources and the one or more second transmission resources are resource blocks (RBs).

3. The system of claim 1, wherein the base station is a serving base station.

4. The system of claim 1, further comprising:
the one or more neighbor base stations, wherein the one or more neighbor base stations are configured to transmit time different of arrival reference signals using the one or more second transmission resources reserved for the one or more neighbor base stations.

5. The system of claim 1, further comprising:
one or more relay stations configured to relay the TDOA-RS to the UE.

6. A user equipment device (UE), comprising:
a radio;
one or more processing elements operatively coupled to the radio; and
one or more memories having program instructions stored thereon that are executable to cause the UE to:
determine a time difference of arrival for a first time difference of arrival reference signal (TDOA-RS) received from a first base station via a radio access network;
determine a time difference of arrival for a second TDOA-RS received from a second base station via the radio access network;
wherein the first TDOA-RS is transmitted using one or more first transmission resources reserved for the first base station and not using one or more second transmission resources reserved for the second base station;
wherein the second TDOA-RS is transmitted using the second one or more transmission resources and not the first one or more transmission resources; and
wherein the first TDOA-RS is transmitted using a first subcarrier within one or more resource blocks for a first transmission instance and wherein the first TDOA-RS is transmitted using a second subcarrier and not the first subcarrier within the one or more resource blocks for a second transmission instance.

7. The UE of claim 6, wherein the one or more first transmission resources and the one or more second transmission resources are resource blocks.

8. The UE of claim 6, wherein the UE is configured to determine a location of the UE based on the first and second TDOA-RS.

9. The UE of claim 6, wherein the first and second TDOA-RS are transmitted using a synchronization channel.

10. The UE of claim 6, wherein the first TDOA-RS is received from a serving base station and the second TDOA-RS is received from a neighbor base station.

11. A method, comprising:
transmitting, by a base station, a time difference of arrival reference signal (TDOA-RS) to a user equipment device (UE), wherein the TDOA-RS is usable to determine proximity of the UE to the base station;
transmitting the TDOA-RS using a first subcarrier within one or more resource blocks for a first transmission instance; and
transmitting the TDOA-RS using a second subcarrier and not the first subcarrier within the one or more resource blocks for a second transmission instance;
wherein the transmitting is performed using one or more first time or frequency resources that are reserved for the base station and not using one or more second time or frequency resources that are reserved for one or more neighbor base stations.

12. The method of claim 11, wherein the base station is not a serving base station for the UE.

13. The method of claim 11, wherein the one or more second time or frequency resources are usable by the one or more neighbor base stations to transmit one or more second TDOA-RS.

14. The method of claim 11, wherein the one or more first time or frequency resources and the one or more second time or frequency resources are resource blocks.

* * * * *